United States Patent [19]

Jones et al.

[11] Patent Number: 4,767,823

[45] Date of Patent: Aug. 30, 1988

[54] HALOGENATED ETHYLENE POLYMERS WITH IMPROVED RESISTANCE TO AGGLOMERATION

[75] Inventors: Edward Jones; Larry A. Meiske; Warren L. Young, all of Baton Rouge, La.

[73] Assignee: The Dow Chemical Company, Midland, Mich.

[21] Appl. No.: 894,441

[22] Filed: Aug. 1, 1986

Related U.S. Application Data

[63] Continuation-in-part of Ser. No. 678,442, Dec. 5, 1984, abandoned.

[51] Int. Cl.$^4$ ................................................ C08F 8/20
[52] U.S. Cl. .................................. 525/334.1; 525/355; 525/356; 525/354.1
[58] Field of Search ...................................... 525/334.1

[56] References Cited

U.S. PATENT DOCUMENTS

| | | | |
|---|---|---|---|
| Re. 29,350 | 8/1977 | Schoen | 526/22 |
| 4,113,805 | 9/1978 | Frey et al. | 426/22 |
| 4,440,925 | 4/1984 | Ohorodnik et al. | 525/356 |

*Primary Examiner*—Joseph L. Schofer
*Assistant Examiner*—Bernard Lipman
*Attorney, Agent, or Firm*—D. R. Howard

[57] ABSTRACT

Halogenated polyethylene resins and halogenated ethylene polymer resins having a reduced tendency to "block" are provided. The halogenated resins are prepared respectively from polyethylene and ethylene polymer starting materials which have a weight-based median particle size of from about 120 to about 600 microns and a weight-based particle size distribution such that more than 60 percent of the particles have a particle size of from about 130 to about 850 microns. The halogenated resins also have a weight-based median particle size of from about 200 to about 900 microns. The halogenated polyethylene resins have a chemically combined halogen content of from about 26 to about 42 weight percent whereas the halogenated ethylene polymer resins have a chemically combined halogen content of from about 15 to about 28 weight percent. The halogenated ethylene polymer resins are prepared from ethylene polymer starting materials which have polymerized therein up to five weight percent of 1-olefin monomer copolymerizable with ethylene.

16 Claims, No Drawings

HALOGENATED ETHYLENE POLYMERS WITH IMPROVED RESISTANCE TO AGGLOMERATION

CROSS REFERENCE TO RELATED APPLICATION

This is a continuation in part, of application Ser. No. 678,442 filed Dec. 5, 1984, now abandoned.

BACKGROUND OF THE INVENTION

The present invention relates to halogenated polyethylene and halogenated ethylene interpolymer resins which are resistant to agglomeration. More particularly, the present invention relates to agglomeration-resistant chlorinated ethylene homopolymer resins and chlorinated ethylene polymer resins.

"Blocking" is a term used to define the tendency of a polymeric resinous powder to form clumps or lumps by agglomeration. Blocking is undesirable because users of resinous powders want free-flowing powders for blending purposes. Resinous powders which block during storage or transport thereof require additional handling to break up agglomerates if blocking is not unacceptably high. Resinous powders with excessively high blocking are of little value because they tend to fuse into a solid mass. In other words, as blocking decreases, desirability and practical utility increase.

SUMMARY OF THE INVENTION

In one aspect, the present invention is a halogenated derivative of polyethylene which is resistant to agglomeration or blocking as prepared. In other words, the halogenated derivative need not be admixed with talc, calcium carbonate or other conventional antiblock additives in order to be agglomeration-resistant. The halogenated polyethylene has three definitive physical properties. First, it has a neat wedge blocking value of from about zero to about 60 kilograms. Second, it has a weight-based median particle size of from about 200 to about 900 microns. Third, it has a chemically combined halogen content of from about 26 to about 42 percent by weight of derivative.

The halogenated polyethylene is prepared from a polyethylene resin having four characteristic physical properties. First, the resin has a weight-based median particle size of from about 120 to about 600 microns. Second, it has a weight-based particle size distribution wherein more than about 60 percent by weight of the particles have a particle size of from about 130 to about 850 microns. Third, it has a bulk density of from about 0.26 to about 0.56 grams per cubic centimeter. Finally, it has a density of from about 0.958 to about 0.965 grams per cubic centimeter.

In a second aspect, the present invention is a halogenated derivative of an ethylene polymer which is resistant to agglomeration or blocking. The derivative has four definitive physical properties. First, it has a neat wedge blocking value of from about zero to about 60 kilograms. Second, it has a weight-based median particle size of from about 200 to about 900 microns. Third, it has a chemically combined halogen content of from about 15 to about 28 percent by weight of derivative. Fourth, it has a heat of fusion of from about zero to about three calories per gram.

The derivative is prepared from an ethylene polymer resin which has polymerized therein from about 95 to about 99 weight percent ethylene and from about five to about one weight percent of 1-olefin monomer copolymerizable therewith, both percentages being based on polymer weight. More than one 1-olefin monomer may be polymerized with ethylene provided the total amount of 1-olefin monomer does not exceed five weight percent.

The ethylene polymer has four characteristic physical properties. First, the polymer has a weight-based median particle size of from about 120 to about 600 microns. Second, it has a weight-based particle size distribution wherein more than about 60 percent by weight of the particles have a particle size of from about 130 to about 850 microns. Third, it has a bulk density of from about 0.25 to about 0.60 grams per cubic centimeter. Finally, it has a density of from about 0.935 to about 0.950 grams per cubic centimeter.

U.S. Pat. No. 4,412,448 (Flynn et al.) discloses a wedge blocking test in which an elongated, trangular-shaped wedge is forced into a preformed cake of material at a constant rate of speed until the cake breaks. The amount of force required to break the cake is known as the wedge blocking value or simply the blocking value. The term "neat wedge blocking value" refers to the amount of force required to break a cake of material formed only from a halogenated derivative of polyethylene or a halogenated derivative of an ethylene polymer. In other words, no talc, calcium carbonate or other antiblock additive is admixed with the halogenated polymer to form the test cake. The neat wedge blocking values of the halogenated derivatives of the present invention distinguish said derivative from similar resins prepared from different starting materials.

DESCRIPTION OF THE PREFERRED EMBODIMENTS

As used herein, the term "polyethylene" means homopolymers of ethylene. Polyethylene resins suitable for purposes of the present invention desirably meet four criteria.

One criterion is a weight-based median particle size of from about 120 to about 600 microns. The median particle size is beneficially from about 120 to about 450 microns. As used herein, the term "weight-based median particle size" means a particle size above and below which there is, in a sieve analysis of a resin sample, an equal weight of resin.

A second criterion is a weight-based particle size distribution in which more than about 60 percent by weight of the particles have a size of from about 130 to about 850 microns. Beneficially, more than about 60 percent by weight of the particles have a size of from about 130 to about 500 microns. Desirably, more than about 60 percent by weight of the particles have a size of from about 130 to about 425 microns.

A third criterion is a bulk density of from about 0.26 to about 0.56 grams per cubic centimeter. A fourth criterion is a density of from about 0.958 to about 0.965 grams per cubic centimeter.

As used herein, the term "ethylene polymer" means interpolymers of ethylene having polymerized therein ethylene and a total amount of 1-olefin monomer copolymerizable therewith. The total amount is suitably from about 1 to about 5 percent by weight of interpolymer. The total amount of 1-olefin monomer is beneficially from about 1.2 to about 3.5 percent by weight of interpolymer. More than one 1-olefin monomer may comprise the total amount. Suitable 1-olefin monomers include 1-butene and 1-octene. Ethylene polymer resins suitable for purposes of the present invention desirably meet four criteria.

One criterion for ethylene polymer resins is a weight-based median particle size of from about 120 to about 600 microns. The median particle size is beneficially from about 120 to about 450 microns.

A second criterion is a weight-based particle size distribution in which more than about 60 percent by weight of the particles have a size of from about 130 to about 850 microns. Beneficially, more than about 60 percent by weight of the particles have a size of from about 130 to about 500 microns. Desirably, more than about 60 percent by weight of the particles have a size of from about 130 to about 425.

A third criterion is a bulk density of from about 0.25 to about 0.60 grams per cubic centimeter. A fourth criterion is a density of from about 0.935 to about 0.950 grams per cubic centimeter.

Polyethylene resins and ethylene polymer resins meeting the aforementioned criteria are beneficially prepared under conditions characteristic of Ziegler polymerization in the presence of a transition metal-containing catalyst and at least one cocatalyst or activator. The cocatalyst is selected from the group consisting of aluminum, boron, zinc, or magnesium compounds represented by the formulas $Al(R^3)_{3-a}X^1_a$, $B(R^3)_{3-a}X^1_a$, $MgR^3_2$, $MgR^3X^1$, $ZnR^3_2$ or mixtures thereof. In these formulas, each $R^3$ is independently a hydrocarbyl group, $X^1$ is a halogen and a is an integer of from zero to two. U.S. Pat. No. 4,526,943 (Fuentes Jr. et al.) discloses such a process.

The transition metal-containing catalyst is suitably prepared in accordance with U.S. Pat. Nos. 4,544,647 (Fuentes Jr. et al.) or 4,456,547 (Fuentes Jr.), the teachings of which are incorporated herein by reference thereto. The transition metal-containing catalyst is beneficially prepared in accordance with copending patent application Ser. No. 794,219, filed Oct. 31, 1985. The catalyst results from admixing at least one each of four components in an inert hydrocarbon diluent and in an atmosphere which excludes moisture and oxygen. One component is a hydrocarbon-soluble organomagnesium material such as butylethylmagnesium. The magnesium concentration of this component is from about 0.05 to about 1 molar. A second component is an organic alcoholic hydroxyl-containing material such as n-propyl alcohol. A third component is a reducing halide source such as ethylaluminum dichloride. The metal concentration of this component is from about 0.5 to about 2 molar. A fourth component is a transition metal (Tm) compound. The four components are added in the order stated except that addition of the third and fourth components can be reversed without adverse effects. The components are present in amounts sufficient to provide atomic ratios as follow: (a) Mg:Tm of 0.1:1 to 100:1; (b) Cl:Mg of 3:1 to 20:1; and (c) OH:total number of hydrocarbyl groups originally attached to the magnesium atom of the organomagnesium material of 0.7:1 to 1.5:1.

The transition metal-containing catalyst may also be prepared by admixing at least one each of four components in an inert hydrocarbon diluent and in an atmosphere which excludes moisture and oxygen. One component is a hydrocarbon-soluble organomagnesium material represented by the formula $R_2Mg \cdot xMR'_{x'}$. In the formula each R is independently a hydrocarbyl group having from 1 to about 20 carbon atoms; each R' is independently hydrogen or a hydrocarbyl group having from 1 to about 20 carbon atoms; M is aluminum (Al) or zinc (Zn); x is an integer of from 0 to 10 and is sufficient to render the organomagnesium component hydrocarbon soluble; and x' has a value equal to the valence of M. The second and third components are suitably the same as those taught in U.S. Pat. No. 4,456,547. The fourth component is represented by the formula $TmY_nX_{z-n}$ or

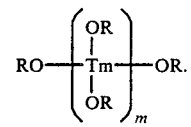

In these formulas Tm is titanium in its highest stable valence state and Y is oxygen or OR''. Each R is independently a hydrocarbyl group having from one to about 20 carbon atoms and each R'' is independently hydrogen or R. X is a halogen, z is an integer equal to the valence state of Tm, m is an integer of from one to 20 and n is an integer of from zero to four. The components are added in the order stated except that addition of the third and fourth components can be reversed without adverse effects. The components are present in amounts sufficient to provide atomic ratios as follows: (a) Mg:Tm of from about 0.1:1 to about 100:1, desirably from about 1:1 to about 40:1; (b) Cl:Mg of from about 3:1 to about 20:1, desirably from about 6:1 to about 20:1; and (c) OH: metal atom from the first component of from about 2:1 to about 3.5:1.

Other catalysts and processes may be used provided the polyethylene resins and ethylene polymer resins produced therewith meet the criteria specified herein and, when halogenated, meet the corresponding criteria also as specified herein.

The halogenated derivatives of polyethylene and ethylene polymers are suitably chlorinated derivatives. The chlorinated derivatives are respectively referred to herein as chlorinated polyethylene resins and chlorinated ethylene polymer resins.

The chlorinated polyethylene resins and chlorinated ethylene polymer resins have three distinctive physical properties. First, they have neat wedge blocking value of from about 0 to about 60 kilograms. The neat wedge blocking value is beneficially from about 0 to about 50 kilograms and desirably from about 0 to about 35 kilograms. The neat wedge blocking values of these resins distinguish them from chlorinated resins prepared from polyethylene and ethylene polymer resins other than those specified herein. Second, they have a weight-based median particle size of from about 200 to about 900 microns. The median particle size is beneficially from about 200 to about 700 microns and desirably from about 200 to about 500 microns. Third, they have a particular chemically combined halogen, preferably chlorine, content. The chlorinated polyethylene resins have a chlorine content which is suitably from about 26 to about 42, beneficially from about 28 to about 40, and desirably from about 30 to about 38 percent by weight of derivative. The chlorinated ethylene polymer resins have a chemically combined chlorine content which is suitably from about 15 to about 28 and beneficially from about 19 to about 26 percent by weight. It has been found that at chlorine contents of greater than 28 percent by weight, blocking of chlorinated ethylene polymer resins becomes excessive.

The chlorinated polyethylene resins and chlorinated ethylene polymer resins of the present invention are prepared by chlorination of the polyethylene and ethylene polymer resins described herein. Chlorination may be accomplished by any known procedure provided the chlorinated derivatives have the aforementioned distinctive physical properties. In other words, chlorination may be accomplished by suspension, slurry and bulk, or fluidized bed, procedures. Suspension chlorination, for example, is disclosed in U.S. Pat. No. 3,454,544, the teachings of which are incorporated herein by reference thereto. Beneficial results are obtained by introducing gaseous chlorine into an aqueous slurry of the polyethylene or ethylene polymer resin at a slurry temperature sufficient to attain a desired chemically combined chlorine content. The slurry need only contain the resin and water. A minor amount of talc and a minor amount of surfactant may be added, if desired, as process aids. Silicic acid, silicon oil and other antiagglomeration aids are neither needed nor desired. Following chlorination, the chlorinated resins are simply washed and dried. Blending one or more conventional anticaking or antiblock additives with the resins, either before or after drying, is not needed as evidenced by the neat wedge blocking values of the resins.

The chlorinated polyethylene resins of the present invention may be used in any application where chlorinated polyethylene is conventionally used. One such application is as an impact modifier for polyvinyl chloride resins.

The following examples are only for purposes of illustration and are not to be viewed as limiting the present invention. All parts and percentages are on a weight basis unless otherwise stated. Examples of the present invention are represented by Arabic numerals whereas comparative examples not part of the present invention are represented by alphabetic characters.

Test Procedures

A. Sieve Analysis

Test sieves having a diameter of 8 inches (3.15 centimeters) and meeting American Society for Testing and Materials (ASTM) Test E-11 specifications were used for particle size analysis. The test sieves were available from W. S. Tyler Incorporated. Each test sieve had a different mesh opening. The test sieves were stacked in descending order with the sieve having the largest mesh or screen opening being at the top. A pan was placed under the lower test sieve and a cover was placed over the top test sieve to form a test sieve assembly.

In operation, the cover was removed and a one hundred gram resin sample was placed on the screen of the top test sieve. The cover was then replaced and the test sieve assembly was secured on a sieve shaker. The sieve shaker, commercially available from Arthur H. Thomas Company, was connected to a timer. The rate of agitation of the sieve shaker was set on a rheostat scale which ranged from a setting of zero to a setting of one hundred. The resin sample was shaken for a period of 15 minutes at a rheostat scale setting of from about 80 to about 100.

After the fifteen minute period, the sieve shaker was stopped. Each of the test sieves was weighed first with and then without resin trapped thereon to determine sieve content weight. Weighing was done with a laboratory balance sensitive to 0.1 gram. Percentage of resin retained on screen was determined by the following formula:

$$\% \text{ Retained} = \frac{\text{sieve content weight} \times 100}{\text{resin sample weight}}$$

B. Wedge Blocking Test

The wedge blocking test used herein is disclosed in U.S. Pat. No. 4,412,448 (Flynn, et al), the teachings of which are incorporated herein by reference thereto. The test comprises two steps. In one step, a sample of particulate polymer resin is compressed between substantially parallel surfaces in a circular mold at a temperature of about 50° Centigrade and a compression pressure of about 515 Kilopascals (kPa) gauge for a period of three hours to form a test cake. The mold is then cooled to a temperature of about 25° Centigrade and the test cake is removed therefrom. In a second step, an elongated, triangular-shaped wedge is forced into the cake at a constant rate of speed until the cake breaks. The force required to break the cake is known as the blocking value. The wedge has a sharp v-shaped configuration at an angle of 60° which extends to about the opposite edges of the test cake. An Instron tester described in ASTM Test D638(1979) is used to force the wedge into the test cake.

The wedge blocking test was used to evaluate resins with and without inorganic particulate antiblock additives in admixture therewith.

EXAMPLE 1 AND COMPARATIVE EXAMPLES A-E

A. Identification of Polyethylene Starting Materials

Polyethylene resins, their source and their commercial designation, where applicable, are set forth in Table I. Each of these resins was subjected to Sieve Analysis as detailed herein. Results of the Sieve Analysis in terms of percent retained on each sieve are set forth together with sieve mesh opening in Table II. Weight based median particle size and two different particle size distributions are shown in Table III.

TABLE I

| Example/ Comparative Example | Polyethylene Resins Source |
|---|---|
| 1 | A non-commercial high density polyethylene resin having a bulk density of 0.39 grams per cubic centimeter and a nominal melt index of 0.3 decigrams per minute. The resin was prepared by The Dow Chemical Company. |
| 2 | A non-commercial high density polyethylene resin having a bulk density of about 0.42 grams per cubic centimeter and a nominal melt index of 0.2 decigrams per minute. The resin was prepared by The Dow Chemical Company. |
| A | A high density polyethylene resin having a bulk density of 0.25 grams per cubic centimeter. The resin was commercially available from Arco Chemical Company under the trade designation SDP 640. |
| B | A high density polyethylene resin having a bulk density of 0.31 grams per cubic centimeter. The resin was commercially available from Arco Chemical Company under the trade designation SDP 113. |
| C | A high density polyethylene resin |

TABLE I-continued

| Example/Comparative Example | Polyethylene Resins Source |
|---|---|
| | having a bulk density of 0.27 grams per cubic centimeter. The resin was commercially available from U. S. Industrial Chemicals Company under the trade designation FA 750. |
| D | A high density polyethylene resin having a bulk density of 0.45 grams per cubic centimeter. The resin was commercially available from American Hoechst Corporation under the trade designation GC 7260. |
| E | A high density polyethylene resin having a bulk density of 0.52 grams per cubic centimeter. The resin was commercially available from Allied Chemical Corporation under the trade designation 60-007. |

TABLE II

Polyethylene Sieve Analysis

| Sieve Number | Screen Opening (Microns) | Percent of Resin Returned on Screen | | | | | | |
|---|---|---|---|---|---|---|---|---|
| | | 1 | 2 | A | B | C | D | E |
| 20 | 850 | 0.7 | 0.3 | 0.1 | 0.1 | 0.1 | 0.5 | 14.9 |
| 30 | 600 | 6.4 | 0.6 | 0.3 | 0.5 | 0.1 | 0.7 | 32.8 |
| 35 | 500 | 16.1 | 1.1 | 0.7 | 0.2 | 0.2 | 0.7 | 14.0 |
| 40 | 425 | 22.0 | 2.0 | 1.6 | 0.8 | 0.1 | 0.6 | 12.5 |
| 45 | 355 | 21.9 | 3.6 | 2.7 | 5.7 | 0.2 | 1.3 | 9.1 |
| 50 | 300 | 12.7 | 8.2 | 0.3 | 3.3 | 0.7 | 2.9 | 6.8 |
| 60 | 250 | 8.7 | 12.1 | 0.2 | 1.8 | 0.9 | 6.2 | 2.7 |
| 70 | 210 | 3.4 | 18.6 | 0.5 | 2.2 | 1.3 | 17.5 | 3.2 |
| 80 | 190 | 2.9 | 12.5 | 0.5 | 10.3 | 1.6 | 13.5 | 1.0 |
| 100 | 150 | 1.5 | 15.0 | 10.8 | 2.3 | 2.0 | 19.0 | 1.3 |
| pan | none | 3.7 | 26.1 | 82.2 | 72.8 | 92.8 | 37.0 | 1.5 |

TABLE III

Polyethylene Particle Size Data

| Sample Identification | Median Particle Size (Microns) | Distribution (Percent) | |
|---|---|---|---|
| | | 150–850 microns | 150–500 microns |
| 1 | 410 | 96.3 | 89.2 |
| 2 | 178 | 73.9 | 73.0 |
| A | l.t. 150 | 17.8 | 17.4 |
| B | l.t. 150 | 27.2 | 6.6 |
| C | l.t. 150 | 7.2 | 7.0 |
| D | about 150 | 63.0 | 61.8 |
| E | 586 | 98.5 | 50.8 | l.t. = less than

B. Chlorination of Polyethylene Resins

Each of the polyethylene resins listed in Table I was chlorinated by an aqueous slurry process in an enclosed vessel. Twenty pounds (9072 grams) of each resin were slurried with 189 pounds (85.7 kilograms) of water in an enclosed vessel. For purposes of process control, each resin was premixed with 250 grams of talc before being added to the water. An additional 250 grams of talc were added during chlorination. The slurry also contained 25 milliliters of a nonyl phenol surfactant commercially available from Thomson Hayward under the trade designation T-det ® 9.5. Gaseous chlorine was introduced into the slurry at a rate of about 0.2 kilograms of chlorine per kilogram of polyethylene per hour. Chlorination began at a slurry temperature of about 98° Centigrade. The slurry temperature was then slowly increased over a period of about fourteen minutes to a temperature of 110° Centigrade. The chlorinated polyethylene had a chemically combined chlorine content of about eight percent by weight of polymer after the fourteen minute period. The temperature of the slurry was then slowly increased over a period of about 95 minutes to a temperature of about 131° Centigrade. After the 95 minute period the chlorinated polymer had a chemically combined chlorine content of about 36 percent by weight of polymer. Chlorination was then terminated and the slurry was filtered to remove the chlorinated polyethylene. The chlorinated polyethylene was washed and then dried at a temperature of about 60° Centigrade for a period of 24 hours. Most of the talc was removed from the chlorinated product during washing as evidenced by measuring residual ash values.

C. Wedge Blocking Test Results

Following chlorination of each of the polyethylene starting materials, wedge blocking test cakes were prepared using the procedure described herein. Some of the chlorinated materials were blended with an amount of an antiblock additive prior to preparation of the test cakes. The antiblock additive (hereinafter abbreviated as "AB") was calcium carbonate. The calcium carbonate was commercially available from Pfizer under the trade designation Superflex™ 200. The test cakes were then subjected to the wedge blocking test described herein. The amount of calcium carbonate together with wedge blocking test force measurements are shown in Table IV.

TABLE IV

Wedge Blocking Test Results

| Example/Sample | Blocking Value (kilograms)+ | | |
|---|---|---|---|
| | Neat* | 2% AB** | 4% AB** |
| 1 | 13.6 | — | 5.0 |
| 1 | 9.6 | — | 3.6 |
| 2 | 15.3 | — | — |
| A | g.t. 113.6 | g.t. 113.6 | 23.2 |
| A | g.t. 113.6 | 59.1 | 37.7 |
| A | g.t. 113.6 | g.t. 113.6 | 99.1 |
| A | g.t. 113.6 | g.t. 113.6 | g.t. 113.6 |
| B | g.t. 113.6 | 54.1 | 19.6 |
| B | g.t. 113.6 | g.t. 113.6 | g.t. 113.6 |
| B | g.t. 113.6 | g.t. 113.6 | 81.8 |
| C | g.t. 113.6 | g.t. 113.6 | 36.4 |
| D | g.t. 113.6 | g.t. 113.6 | g.t. 113.6 |
| D | 104.6 | 30.9 | 15.9 |
| E | 70.4 | 51.8 | 25.0 |

+Upper limit of test measurement was 113.6 Kilograms (250 pounds)
*No calcium carbonate admixed with chlorinated resin prior to forming test cake.
**Percent by weight of calcium carbonate admixed with chlorinated resin prior to forming test cake.
—Test not run.
g.t. greater than

TABLE V

Chlorinated Polyethylene Sieve Analysis

| Sieve Number | Screen Opening (Microns) | Percent of Chlorinated Resin Retained on Screen | | | | | | |
|---|---|---|---|---|---|---|---|---|
| | | 1 | $2^a$ | $A^b$ | $B^c$ | C | $D^d$ | E |
| 20 | 850 | 0.9 | 0.1 | 7.4 | 23.1 | 9.5 | 3.2 | 26.2 |
| 30 | 600 | 7.8 | 0.4 | 14.3 | 23.2 | 27.4 | 2.8 | 38.7 |
| 35 | 500 | 17.1 | 1.7 | 22.7 | 17.4 | 33.7 | 1.7 | 10.8 |
| 40 | 425 | 23.4 | 7.3 | 22.9 | 12.5 | 21.7 | 3.2 | 11.1 |
| 45 | 355 | 19.7 | 17.7 | 19.1 | 8.6 | 5.1 | 7.6 | 5.6 |
| 50 | 300 | 12.6 | 24.7 | 10.3 | 5.4 | 1.9 | 14.0 | 2.5 |
| 60 | 250 | 8.3 | 18.0 | 2.5 | 4.9 | 0.3 | 28.2 | 2.0 |
| 70 | 210 | 2.0 | 17.6 | 0.6 | 2.6 | 0.1 | 16.3 | 1.4 |
| 80 | 190 | 4.4 | 5.2 | 0.1 | 1.3 | 0.0 | 10.3 | 0.7 |
| 100 | 150 | 1.9 | 4.5 | 0.0 | 0.8 | 0.0 | 7.9 | 0.7 |
| pan | none | 1.5 | 2.9 | 0.1 | 0.2 | 0.2 | 4.8 | 0.3 |
| weight-based | | 422 | 254 | 481 | 579 | 561 | 225 | 696 |

TABLE V-continued

| Sieve Number | Screen Opening (Microns) | Percent of Chlorinated Resin Retained on Screen | | | | | |
|---|---|---|---|---|---|---|---|
| | | 1 | 2[a] | A[b] | B[c] | C | D[d] | E |
| median particle size (microns) | | | | | | | | |

[a] Average of 4 sieve analyses
[b] Average of 5 sieve analyses
[c] Average of 6 sieve analyses
[d] Average of 3 sieve analyses A review of the data presented in Tables I–V highlights several points. First, the halogenated derivatives of the present invention (Samples 1 and 2) are less susceptible to blocking or agglomeration than halogenated derivatives of conventional polyethylene resins (Samples A–E). Second, the derivatives of the present invention differ physically from derivatives of conventional polyethylene resins in terms of both particle size distribution and weight-based median particle size (See Table V). Third, the derivatives of the present invention have a particle size growth, based on polyethylene resin starting material, which is less than that of all comparative samples save Samples D & E (See, Tables II, III, and V). Similar results are obtained with other halogenated derivatives within the scope of the present invention.

Effect of Chlorine Content of Chlorinated Ethylene Polymer Upon Blocking

Samples of an ethylene polymer prepared by The Dow Chemical Company were chlorinated as described herein to different chlorine contents to determine the effect of chlorine content upon blocking. The ethylene polymer had polymerized therein 98.2 weight percent ethylene and 1.8 weight percent 1-butene, both percentages being based upon polymer weight. The ethylene polymer had a nominal melt index of 1.1 decigrams per minute and a density of from about 0.948 grams per cubic centimeter. Following chlorination, wedge blocking test cakes were prepared using the procedure described herein. The test cakes were then subjected to the wedge blocking test described herein. Results of the wedge blocking test are presented in Table VI together with chlorine content and heat of fusion.

TABLE VI

| | Chlorinated Ethylene Polymer Wedge Blocking Test Results | | |
|---|---|---|---|
| Sample | Chlorine Content (%) | Heat of Fusion (Calories per gram) | Neat Wedge Blocking Value (kilograms) |
| 3 | 21.4 | 1.13 | 7.7 |
| 4 | 23.7 | 2.59 | 11.9 |
| 5 | 26.2 | 0.09 | 10.9 |
| F | 28.2 | 1.09 | 71.6 |

A review of the data presented in Table VI demonstrates that as chlorine content increases beyond 28 percent by weight of polymer, blocking becomes unacceptably high. Similar results are obtained with other halogenated ethylene polymers which are representative of the present invention.

What is claimed is:

1. An agglomeration-resistant, halogenated derivative of polyethylene, said derivative (a) having (1) a neat wedge blocking value of from about 0 to about 60 kilograms, (2) a weight-based median particle size of from about 200 to about 900 microns and (3) a chemically combined halogen content of from about 26 to about 42 percent by weight of derivative; and (b) being prepared by halogenating a polyethylene resin in an aqueous slurry consisting essentially of water and the resin, and, after terminating chlorination and without adding a mixture of talc and one or more fixing agents thereto, separating the halogenated derivative from the slurry, washing the separated derivative with water and drying said washed, separated derivative, the polyethylene resin, prior to halogenation, having (1) a weight-based particle median particle size of from about 120 to about 600 microns, (2) a weight-based median particle size such that more than about 60 percent of the particles have a particle size of from about 130 to about 850 microns, (3) a bulk density of from about 0.26 to about 0.56 grams per cubic centimeter and (4) a density of from about 0.958 to about 0.965 grams per cubic centimeter.

2. The halogenated polyethylene of claim 1 wherein the halogen is chlorine.

3. The halogenated polyethylene of claim 1 wherein the polyethylene resin has a weight-based median particle size of from about 120 to about 450 microns.

4. The halogenated polyethylene of claim 1 wherein the polyethylene resin has a weight-based particle size distribution such that more than about 60 percent of the particles have a particle size of from about 130 to about 500 microns.

5. The halogenated polyethylene of claim 1 wherein the neat wedge blocking value is from about 0 to about 50 kilograms.

6. The halogenated polyethylene of claim 1 wherein the derivative has a weight-based median particle size of from about 200 to about 500 microns.

7. The halogenated polyethylene of claim 2 wherein the chlorine content is from about 28 to about 40 percent by weight of derivative.

8. An agglomeration-resistant, halogenated derivative of an ethylene polymer, the ethylene polymer having polymerized therein, on a polymer weight basis, from about 95 to about 99 percent ethylene and from about 5 to about 1 weight percent of 1-olefin monomer copolymerizable therewith, said ethylene polymer having (a) a weight-based particle median particle size of from about 120 to about 600 microns, (b) a weight-based median particle size such that more than about 60 percent of the particles have a particle size of from about 130 to about 850 microns, (c) a bulk density of from about 0.26 to about 0.56 grams per cubic centimeter and (d) a density of from about 0.935 to about 0.950 grams per cubic centimeter, the halogenated derivative being prepared by halogenating the ethylene polymer in an aqueous slurry consisting essentially of water and the polymer, and, after terminating chlorination and without adding a mixture of talc and one or more fixing agents thereto, separating the halogenated derivative from the slurry, washing the separated derivative with water and drying said washed, separated derivative, said dried derivative having (a) a chemically combined halogen content of from about 15 to about 28 percent by weight of derivative, (b) a weight-based median particle size of from about 200 to about 900 microns, (c) a neat wedge blocking value of from about 0 to about 60 kilograms and (d) a heat of fusion of from about 0 to about 3 calories per gram.

9. The halogenated ethylene polymer of claim 8 wherein the halogen is chlorine.

10. The halogenated ethylene polymer of claim 8 wherein the derivative has a weight-based median particle size of from about 200 to about 500 microns.

11. The halogenated ethylene polymer of claim 8 wherein the ethylene polymer resin has a weight-based particle size distribution such that more than about 60 percent by weight of the particles have a size of from about 130 to about 500 microns.

12. The halogenated ethylene polymer of claim 8 wherein the ethylene polymer resin has polymerized therein, on a polymer weight basis, from about 1.2 to about 3.5 weight percent of 1-olefin monomer.

13. The halogenated ethylene polymer of claim 9 wherein the chlorine content is from about 19 to about 26 percent by weight of polymer.

14. The halogenated ethylene polymer of claim 8 wherein the ethylene polymer has a density of from about 0.935 to about 0.950 grams per cubic centimeter.

15. The halogenated derivative of claim 1 wherein the slurry, prior to halogenation, also contains minor amounts of talc and surfactant.

16. The halogenated derivative of claim 8 wherein the slurry, prior to halogenation, also contains minor amounts of talc and surfactant.

* * * * *